United States Patent

Duwaer

[11] Patent Number: 5,960,366
[45] Date of Patent: Sep. 28, 1999

[54] WRIST-WATCH WIRELESS TELEPHONE

[75] Inventor: Arne L. Duwaer, Eindhoven, Netherlands

[73] Assignee: U.S. Philips Corporation, New York, N.Y.

[21] Appl. No.: 08/742,688

[22] Filed: Oct. 31, 1996

[30] Foreign Application Priority Data

Nov. 2, 1995 [EP] European Pat. Off. .............. 95202950

[51] Int. Cl.⁶ ..................................................... H04Q 7/32
[52] U.S. Cl. ........................... 455/556; 455/563; 455/566; 455/568; 368/13
[58] Field of Search ..................... 455/556, 563, 455/566, 568; 368/13

[56] References Cited

U.S. PATENT DOCUMENTS

| | | | |
|---|---|---|---|
| 5,224,076 | 6/1993 | Thorp | 368/10 |
| 5,231,381 | 7/1993 | Duwaer | 340/712 |
| 5,371,779 | 12/1994 | Kobayashi | 379/68 |
| 5,381,387 | 1/1995 | Blonder et al. | 368/10 |
| 5,465,401 | 11/1995 | Thompson | 455/566 |
| 5,508,978 | 4/1996 | Kalbermatter et al. | 368/13 |
| 5,541,372 | 7/1996 | Baller et al. | 178/18.01 |
| 5,590,417 | 12/1996 | Rydbeck | 455/568 |

FOREIGN PATENT DOCUMENTS

| | | | |
|---|---|---|---|
| 0626773A1 | 11/1994 | European Pat. Off. | H04M 1/72 |
| 0643518A1 | 3/1995 | European Pat. Off. | H04M 1/72 |
| 2171821 | 9/1986 | United Kingdom . | |
| WO9419736 | 9/1994 | WIPO . | |
| WO9508813 | 3/1995 | WIPO | G06K 11/06 |

Primary Examiner—Andrew M. Dolinar

[57] ABSTRACT

Known is a wrist-watch telephone with an LCD display, and further a portable wireless data collection terminal. Such devices do not take into account all human factors that are to be considered for getting a true multimedia miniature and portable wireless two-way telephone. A wrist-watch wireless telephone is proposed having an interactive display screen as a graphical interface, preferably pen-activated. For still more multimedia like operation, screen functions of the wrist-watch wireless telephone are controlled by further actuators such as a watch button.

17 Claims, 3 Drawing Sheets

WRIST-WATCH WIRELESS TELEPHONE

BACKGROUND OF THE INVENTION

1. Field of the Invention

The present invention relates to a wrist-watch wireless telephone comprising two-way wireless telephone circuitry, a microphone, a loudspeaker, and a display screen.

2. Description of the Related Art

A wrist-watch wireless telephone of this kind is known from the British patent application GB 2 171 821. In GB 2 171 821 a combination of an electronic wristwatch and a two-way radio communication system is described. A strap of the wrist watch comprises an antenna. As described in relation to FIGS. 1 and 2 of GB 2 171 821 a casing of the wrist-watch comprises a microphone, an LCD-display, and a two-way telephone circuitry so as to allow wireless communication with other subscribers that have subscribed to a telephone system supporting wrist-watch wireless telephones of this kind.

Furthermore, from the PCT patent application WO 94/19736, a portable wireless data collection terminal for radio communication with a computer is known having a matrix type touch sensitive or pen-actuatable bit-mapped display screen. The display screen can be configured as a keyboard for manual input of alphabetical characters and can also show alphanumerical and graphic data. Such a data terminal can be used for instance to alphanumerically and graphically display a customer invoice and to transmit a customer's signature as an acknowledgement of the invoice.

Furthermore, an interactive display as such is known from the U.S. Pat. No. 5,231,381.

Furthermore, so-called PDAs (Personal Digital Assistants) are known as a portable pen-computer, these PDAs having an interactive display.

None of the above prior art documents takes into account all human factors that are to be considered for getting a true multi-media miniature and portable wireless two-way telephone.

SUMMARY OF THE INVENTION

It is an object of the present invention to provide a true multi-media wireless two-way telephone that has the appearance of a wrist-watch.

To this end the wrist-watch wireless telephone according to the present invention is characterised in that the display screen is an interactive display screen so as to at least in part form a graphical user-interface. The present invention is based upon the insight that for getting a true multi-media wireless two-way telephone all relevant human factors should be taken into account, namely a telephone loudspeaker close to an ear of the user of the telephone, the microphone relatively close to the user's mouth, readability, the interactive display screen at reading distance of the user's eye, for portability, a one-piece device.

In an embodiment of a wrist-watch wireless telephone according to the present invention the interactive display screen is of a matrix type so as to allow pen sensitive activation of screen coordinates and/or is of a type so as to allow finger sensitive activation of screen coordinates. Herewith great flexibility is achieved for both display and input functions.

In a further embodiment of a wrist-watch telephone according to the present invention the telephone comprises a microcontroller which is coupled to the interactive display screen, wherein the microcontroller is arranged to cooperate with the two-way telephone circuitry so as to allow interactive messages coming from a far-end to be displayed on the interactive display screen. Herewith, the user of the wrist-watch telephone can get visually displayable messages from the far-end subscriber and can interactively react on such messages. In one example, the interactive display can be used as a shared workspace for a the near-end and the far-end user.

In a further embodiment of a wrist-watch telephone according to the present invention the loudspeaker is a wireless loudspeaker for attachment to or in an ear of a user of the telephone, the wireless loudspeaker and the wrist-watch wireless telephone comprising a respective transmitter and receiver for exchanging modulated audio signals. In this way the user has maximum freedom of movement without being bothered by unnecessary connection wires.

In a further embodiment of a wrist-watch telephone according to the present invention the telephone comprises a watch button for controlling at least one watch function and a rotational-to-electrical-converter for converting a rotation of the watch button to an electrical control signal, the converter being coupled to the microcontroller. Herewith, interactivity is still further improved. The watch button can be used to control ordinary watch functions and further to select names of a telephone directory to be displayed on the interactive display by using rotation of the watch button to scroll along the telephone directory and to select an indicated entry by pushing the watch button or by acknowledging the indicated entry by means of a sensitive pen cooperating with the interactive display screen, or the like. For specific functions, further watch buttons with appropriate interfaces to the microcontroller can be used.

In a further embodiment of a wrist-watch telephone according to the present invention the microphone, the watch button, and the interactive display screen are used in combination so as to form a combined user interface. The microphone can be used for voice input of control commands, and the watch button and the interactive display for functions as indicated before. For instance, the command could be "dial" initiating displaying of a telephone directory on the display. The watch button could then be used for selecting an entry on the telephone directory, and an active pen could be used to acknowledge the selected entry.

In a still further embodiment of a wrist-watch telephone according to the present invention the telephone comprises voice recognition circuitry for recognising voice commands inputted via the microphone, the voice recognition circuitry being coupled to the microcontroller. Herewith, user spoken commands can be recognised. Recognition of spoken commands can be used for voice dialling, for instance. When using voice dialling or inputting of other spoken commands, the display can be a usual display.

In order to incorporate PDA-like functionality in a wrist-watch telephone according to the present invention the microcontroller is arranged for recognizing handwritten information or commands on the interactive display screen.

In embodiments of a wrist-watch telephone according to the present invention a telephone-antenna for modulated telephone signals and a loudspeaker-antenna for wireless communication with the wireless loudspeaker are built-in in a watch-strap of the wrist-watch telephone. The wrist-watch telephone have cellular or cordless telephone functionality, such as according to the GSM or DECT system, or according to any other suitable system for wireless conveying of telephone signals. The wireless connection between the wrist-watch telephone and the wireless loudspeaker can be a very low power FM connection applying digital modulation techniques like FSK or PSK, or any other suitable wireless connection or modulation technique.

BRIEF DESCRIPTION OF THE DRAWING

The present invention will now be described, by way of example, with reference to the accompanying drawings, wherein FIG. 1 schematically shows a telephony system comprising wrist-watch wireless telephones according to the present invention.

Throughout the figures the same reference numerals are used for the same features.

DETAILED DESCRIPTION

Figure 1:
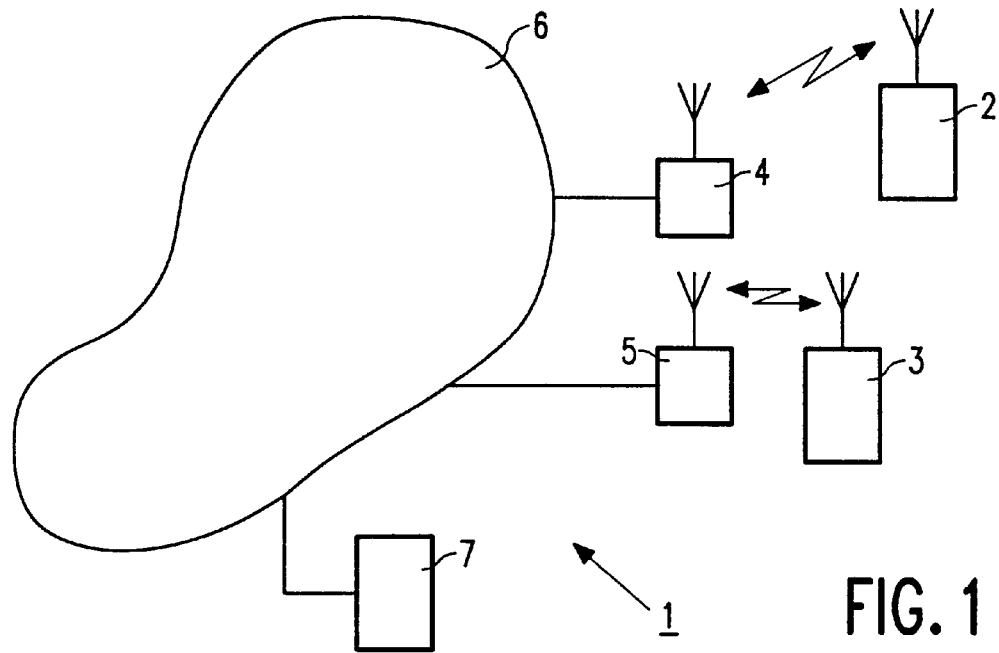

FIG. 1 schematically shows a telephony system 1 comprising wrist-watch wireless telephones 2 and 3 according to the present invention. In the given example, the system 1 is a digital cordless telephony system in accordance with the DECT Standard (Digital European Cordless Telecommunications) as standardized by ETSI (European Telecommunications Standards Institute), but the system can be any suitable wireless telephone system or wireless LAN (Local Area Network) with telephone services, or the like. The system 1 comprises radio base stations 4 and 5 coupled to the public switched telephone network 6. The wireless telephones 2 and 3 arranged for bi-directional communication with the radio base stations 4 and 5 to which they are authorized to communicate. The wireless telephones 2 and 3 can communicate with each other or with fixed network telephone set 7 or any other suitable device.

Figure 2:
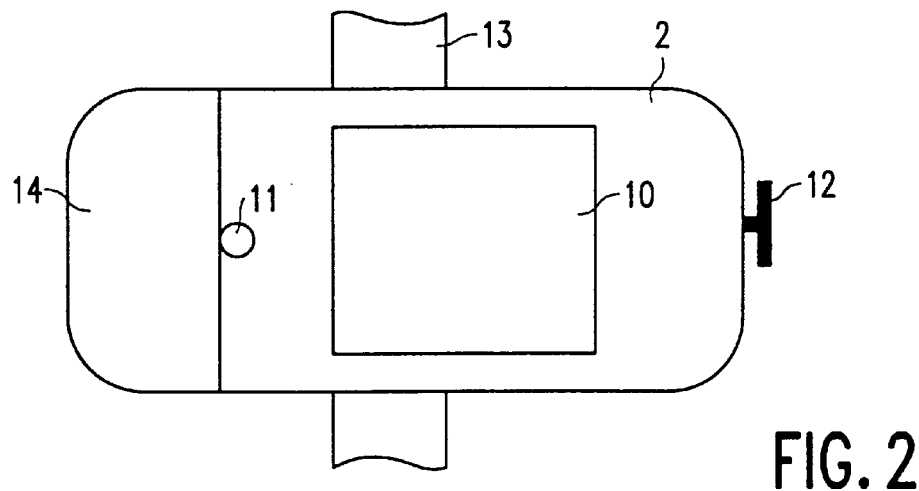
FIG. 2 shows an embodiment of the wrist-watch wireless telephone according to the present invention.

FIG. 2 shows an embodiment of the wrist-watch wireless telephone 2 according to the present invention comprising an interactive display screen 10 as a graphical user-interface, a microphone 11, a wrist-watch button 12, a watch-strap 13, and a battery pack 14. The wrist-watch wireless telephone 2 further comprises circuitry to be described in the sequel.

Figure 3:
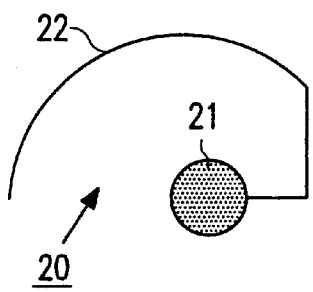
FIG. 3 shows a wireless loudspeaker of a wrist-watch wireless telephone according to the present invention.

FIG. 3 shows a wireless loudspeaker 20 of the wrist-watch wireless telephone 2 according to the present invention comprising a speaker 21 with an integrated radio receiver (of a common type and not shown in detail) and an ear-clip 22 with an integrated radio antenna (not shown in detail). The wireless loudspeaker 20 is used in a preferred embodiment of the wrist-watch wireless telephone 2, but in another embodiment the loudspeaker can be a wired type either integrated in the wireless telephone 2 or connected to the wireless telephone 2 by wire (not shown in detail).

Figure 4:
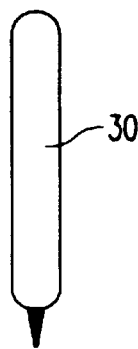
FIG. 4 shows a specific pen for cooperation with an interactive display according to the present invention.

FIG. 4 shows a specific pen 30 for cooperation with the interactive display 10 according to the present invention, such a pen being commercially available. The display screen 10 can be a matrix type LCD screen, e.g. up to 480 by 320 pixels. At a side opposite to the display side, the screen can comprise a pen sensor for detecting screen positions or areas the pen 30 is touching. The screen can also be made sensitive for touching by a user's finger. Such pen screen combinations are known in the art per se and are not described in detail here.

Figure 5:
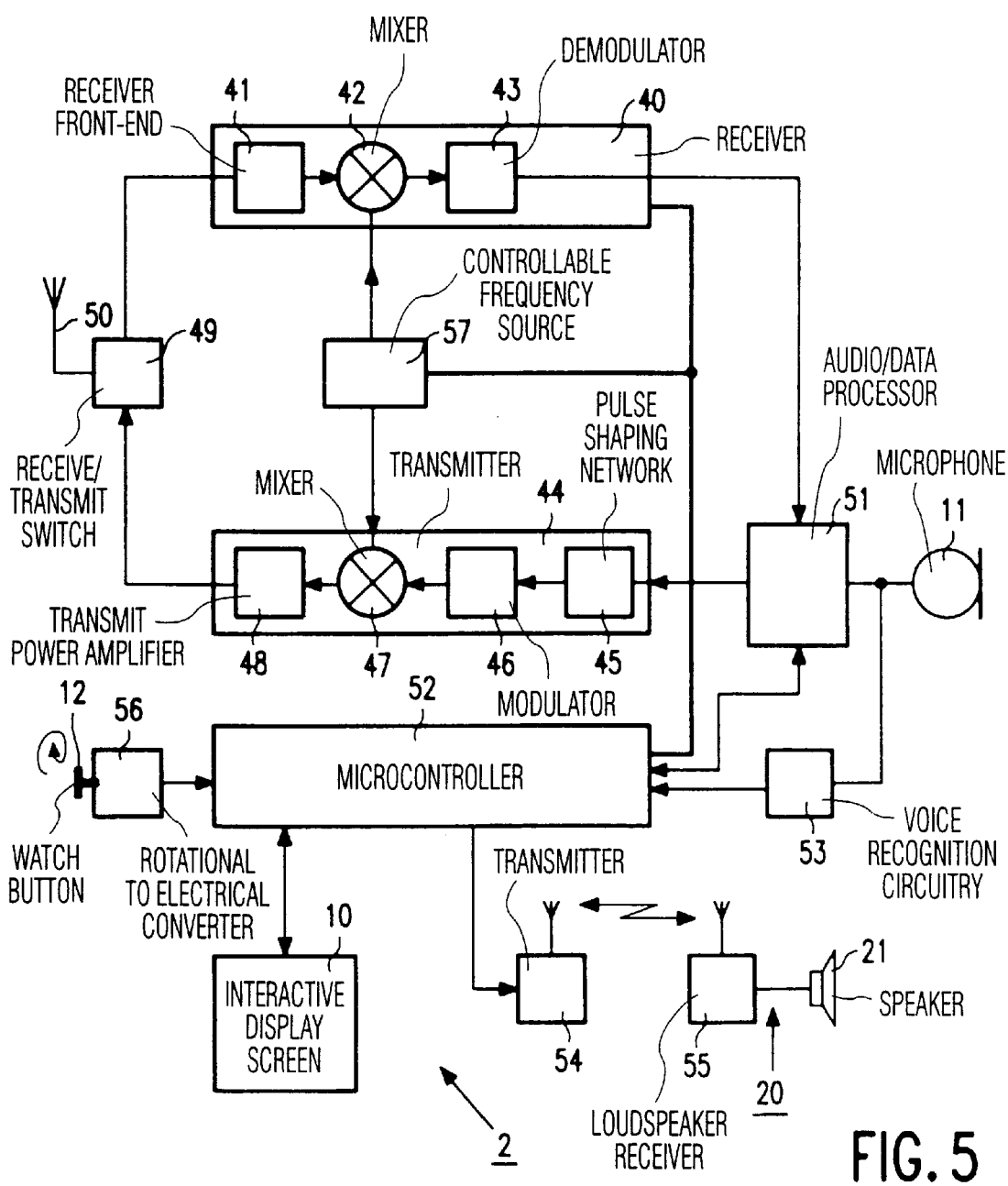
FIG. 5 shows an electrical diagram of a wrist-watch wireless telephone according to the present invention.

FIG. 5 shows an electrical diagram of the wrist-watch wireless telephone 2 according to the present invention. The wireless telephone 2 comprises a receiver 40 having a receiver front-end 41, a mixer 42, and a demodulator 43. The receiver 40 is arranged for receiving both voice and data so as to allow for multi-media communication. The wireless telephone 2 further comprises a transmitter 44 having a pulse shaping network 45, a modulator 46, a mixer 47, and a transmit power amplifier 48. At RF-side, the receiver 40 and the transmitter 44 are coupled to a receive/transmit switch 49 which is coupled to an antenna 50. The antenna 50 is preferably built-in in the watch-strap 13. At LF-side, the receiver 40 and the transmitter 44 are coupled to an audio/data processor 51 for processing voice and/or data. For speech transmission, the audio/data processor 51 processes a speech signal from the microphone 11 in accordance with the DECT Standard. For data transmission, the audio/data processor 51 receives data to be transmitted from a microcontroller 52 which is also arranged for overall-control of the wrist-watch wireless telephone 2. The telephone 2 further comprises voice recognition circuitry 53 which is coupled between the microphone 11 and the microcontroller 52. The circuitry 53 may include a separate and suitably programmed digital signal processor that assists the microcontroller 52 in recognizing spoken or handwritten commands from the user of the wireless telephone 2. The wireless telephone 2 further comprises a transmitter 54 for transmitting modulated audio signals to a loudspeaker receiver 55. The wireless link between the transmitter and the receiver preferably is a very low power radio link using FM modulation, but can also be any other suitable wireless link such as an infra-red link. The watch button 12 is coupled to the microcontroller 52 via a rotational-to-electrical-converter 56 so as to allow the watch button to be used for control functions of the telephone 2. For tuning purposes, the wireless telephone comprises a controllable frequency source 57. All the above described hardware make the wrist-watch wireless telephone 2 particularly suitable as a miniature true multimedia telephone, the microphone 11, the watch button 12, and the specific pen 30 cooperating with the interactive display 10 forming a miniature and easy portable multimedia user interface.

Figure 6A:
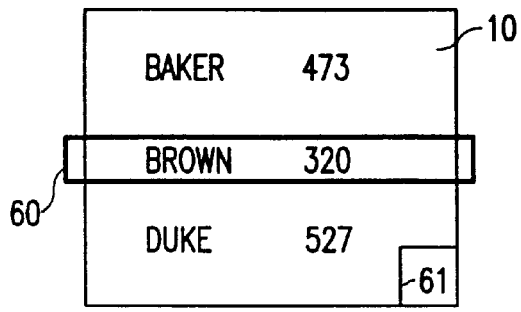
FIGS. 6A and 6B show name dialling on a display of a wrist-watch wireless telephone according to the present invention.
Figure 6B:
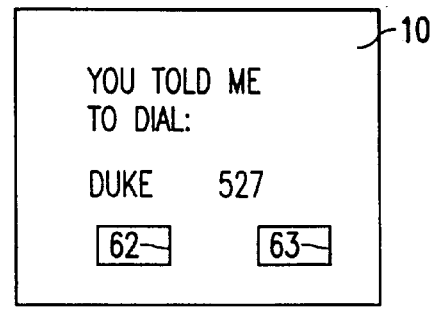

FIGS. 6A and 6B show name dialling on the display 10 of the wrist-watch wireless telephone 2 according to the present invention. When name dialling is selected by the user on a main menu (not shown in detail) on the display screen 10, as shown in FIG. 6A, a name list with telephone numbers as stored in the microcontroller 52 is shown on the display screen 10. This name list can be scrolled on the display by rotating the watch button 12 and by correspondingly moving a high-lighted window on the display screen 10. In the given example, the names 'Baker', 'Brown', and 'Duke' are shown with respective telephone extension '473', '320', and '527'. When the user has found the correct entry on the name list he can activate a pen sensitive area 61 to initiate dialling, in the example 'Brown', or he can press the watch button 12. The dialling protocol as such is a conventional dialling protocol and not described in detail here. In FIG. 6B another form of name dialling is shown in the form of an interactive message to be confirmed. In a near-end user receives a message on the display 'You told me to dial: Duke 527'. Via respective pen sensitive areas 62 and 63 on the display 11, this message can be responded in the affirmative or in the negative.

Figure 7A:
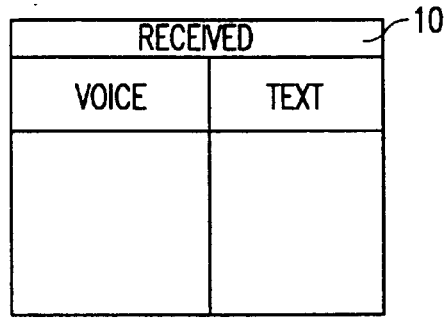
FIGS. 7A and 7B show messages on a display of a wrist-watch wireless telephone according to the present invention.
Figure 7B:
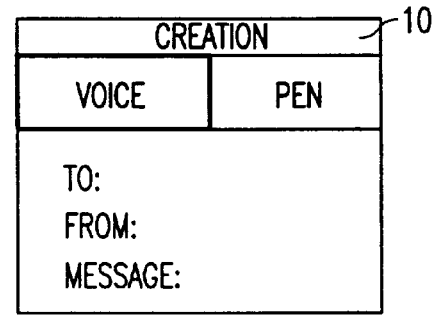

FIGS. 7A and 7B show messages on the display 10 of the wrist-watch wireless telephone 2 according to the present invention. In FIG. 7A a received message is shown which can either be a text message or a spoken message, the mode to be selected by the user via pen sensitive areas 'Voice' or 'Text'. In FIG. 7B message creation is shown, either in voice mode or in pen mode. When in voice mode, the message to be created is spoken. Spoken 'TO', 'FROM' and 'MESSAGE'-commands are then recognized by the recognition circuitry 53 and in cooperation with the microcontroller 52, the respective entries can be filled with recognized spoken names and recognized standard messages. In a further embodiment, user may be asked to confirm a recognized name. When in pen mode, the names and standard messages can be selected via lists scrolled by means of the watch button 12 and the pen 30 can be used to confirm entries. In the latter mode, messages can also be created and entered by laying out part of the display 10 as an alphanumeric keyboard and by selecting alphanumeric characters by means of the pen 30.

Figure 8A:
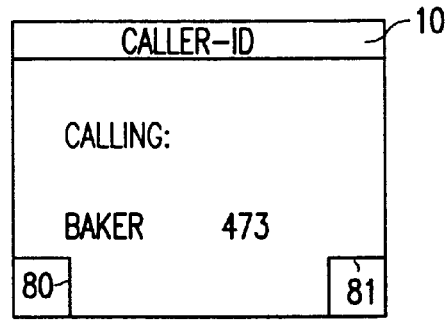
FIGS. 8A and 8B show information on a display of a wrist-watch wireless telephone according to the present invention.
Figure 8B:
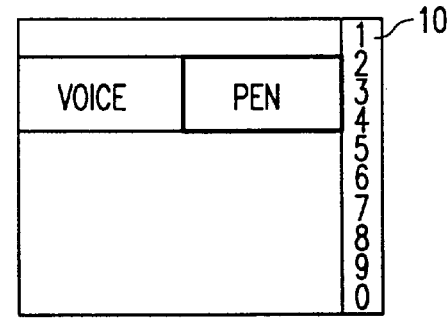

FIGS. 8A and 8B show information on the display 10 of the wrist-watch wireless telephone 2 according to the present invention. In FIG. 8A, the display 10 is used to display the far-end's caller-ID. When pen-activating a pen sensitive area 80 the near-end user can select an answering/connect mode, and when pen-activating a pen sensitive area 81 the near-end user can select an ignore/disconnect mode. In FIG. 8B, the display 10 is used to as a screen for displaying teletext messages, pages of which are pen-selected. In the latter embodiment, the telephone system 1 is provided with a teletext server for supplying such messages. In still another mode, the display screen is used as a miniature TV-screen for displaying received TV-programs. In this mode, the system 1 is provided with a TV-server and has enough transmission bandwidth to transmit acceptable TV-information.

Figure 9:
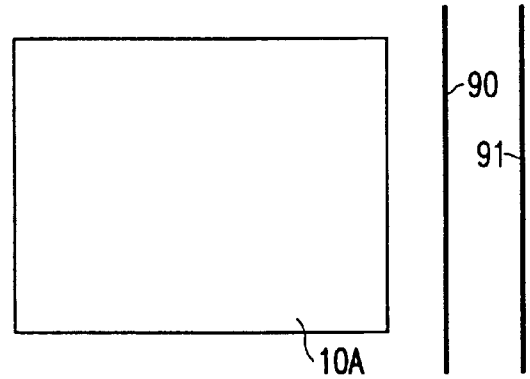
FIG. 9 shows displays of two wrist-watch wireless telephones according to the present invention used as a shared display.
Figure 9:
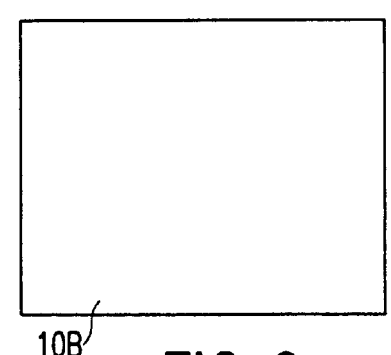

FIG. 9 shows displays of two wrist-watch wireless telephones 2 and 3 according to the present invention used as a shared display screen 10. Display screen 10A represents the physical screen of the wrist-watch wireless telephone 2 and display screen 10B represents the physical screen of the wrist-watch wireless telephone 3. The two vertical bold lines 90 and 91 represent a telephone connection between the wrist-watch wireless telephones 2 and 3. In this shared interactive work-space mode, the microcontrollers in the respective wrist-watch wireless telephones are programmed such that activation of pen sensitive areas and pen writing on a writing area of the display screen by one user is coded and transmitted to the other user, and vice versa.

I claim:
1. A wrist-watch wireless telephone comprising:
two-way wireless telephone circuitry, a microphone, a loudspeaker, a microcontroller, and an interactive display screen,
the microphone, the loudspeaker, and the microcontroller being coupled to the two-way wireless telephone circuitry, the interactive display screen being coupled to the microcontroller and at least in part forming a graphical user-interface, and
the microcontroller being arranged to cooperate with the two-way telephone circuitry so as to allow an interactive message coming from a far-end user to be displayed on the interactive display screen, and to generate a response to the far-end user upon activation of a sensitive area of the interactive display screen by a near-end user.

2. A wrist-watch wireless telephone according to claim 1, wherein the interactive display screen is of a matrix type so as to allow pen sensitive activation of screen coordinates.

3. A wrist-watch wireless telephone according to claim 1, wherein the interactive display screen is of a type so as to allow finger sensitive activation of screen coordinates.

4. A wrist-watch wireless telephone according to claim 1, wherein the loudspeaker is a wireless loudspeaker for attachment to or in an ear of a user of the telephone, the wireless loudspeaker and the wrist-watch wireless telephone comprising a respective transmitter and receiver for exchanging modulated audio signals.

5. A wrist-watch wireless telephone according to claim 4 comprising a loudspeaker-antenna built-in in the antenna strap for wireless communication with the wireless loudspeaker.

6. A wrist-watch wireless telephone according to claim 1 comprising voice recognition circuitry for recognising voice commands inputted via the microphone, the voice recognition circuitry being coupled to the microcontroller.

7. A wrist-watch wireless telephone according to claim 1, wherein the microcontroller is arranged for recognizing handwritten information or commands on the interactive display screen.

8. A wrist-watch wireless telephone according to claim 1 comprising a watch-strap and a telephone-antenna which is built-in in the watch-strap.

9. A wrist-watch wireless telephone as claimed in claim 1, wherein the interactive message is a far-end user's caller identification and the response is connecting to the far-end user.

10. A wrist-watch wireless telephone as claimed in claim 1, which is operated by the near-end user and which is arranged to cooperate with another wrist-watch telephone with another interactive display screen operated by the far-end user, the interactive display screen of the wrist-watch telephone forming a shared work-space with the other interactive display screen such that the interactive message and the response operate on both the interactive display screen and the other interactive display screen.

11. A wrist-watch wireless telephone as claimed in claim 1, wherein the interactive message is a message from the far-end user comprising a telephone number to be dialed, and the response is connecting to the telephone number.

12. A wrist-watch wireless telephone comprising:
two-way wireless telephone circuitry, a microphone, a loudspeaker, a microcontroller, an interactive display screen with a sensitive area which generate an electrical signal upon activation thereof, a watch button for controlling at least one watch function, and a rotational-to-electrical-converter for converting a rotation of the watch button to an electrical control signal,
the microphone, the loudspeaker, and the microcontroller being coupled to the two-way wireless telephone circuitry,
the rotational-to-electrical-converter being coupled to the microcontroller, the interactive display screen being coupled to the microcontroller and at least in part forming a graphical user-interface, and the electrical control signal and the electrical signal cooperatively controlling a telephone function.

13. A wrist-watch wireless telephone as claimed in claim 12, wherein the telephone function is name dialing of a far-end user by the near end-user, the electrical control signal controls scrolling of a name list of far-end users, which name list is generated by the microcontroller on the interactive display screen, and the electrical signal causes dialing of a far-end user indicated by the electrical control signal.

14. A wrist-watch wireless telephone as claimed in claim 12, wherein the telephone function is sending a standard message from the near-end user to the far-end user, the electrical control signal controls scrolling of a list of standard messages which is generated by the microcontroller on the interactive display screen, and indicates a standard message to be sent, and the electrical signal causes sending of the indicated standard message.

15. A wrist-watch wireless telephone as claimed in claim 12, wherein the interactive display screen is of a matrix type so as to allow pen sensitive activation of screen coordinates.

16. A wrist-watch wireless telephone as claimed in claim 17, wherein the interactive display screen is of a type so as to allow finger sensitive activation of screen coordinates.

17. A wrist-watch wireless telephone as claimed in claim 12, wherein the loudspeaker is a wireless loudspeaker for attachment to or in an ear of a user of the telephone, the wireless loudspeaker and the wrist-watch wireless telephone comprising a respective transmitter and receiver for exchanging modulated audio signals.

* * * * *